(12) United States Patent
Zhang

(10) Patent No.: US 9,110,198 B2
(45) Date of Patent: Aug. 18, 2015

(54) BACKLIGHT MODULE

(71) Applicant: Shenzhen China Star Optoelectronics Technology Co., LTD., Shenzhen, Guangdong (CN)

(72) Inventor: Pangling Zhang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 282 days.

(21) Appl. No.: 13/703,892

(22) PCT Filed: Oct. 12, 2012

(86) PCT No.: PCT/CN2012/082816
§ 371 (c)(1),
(2) Date: Dec. 12, 2012

(87) PCT Pub. No.: WO2014/047979
PCT Pub. Date: Apr. 3, 2014

(65) Prior Publication Data
US 2014/0085926 A1    Mar. 27, 2014

(30) Foreign Application Priority Data

Sep. 26, 2012 (CN) .......................... 2012 1 0363733

(51) Int. Cl.
*F21V 7/04* (2006.01)
*F21V 8/00* (2006.01)

(52) U.S. Cl.
CPC ............ *G02B 6/0011* (2013.01); *G02B 6/0088* (2013.01)

(58) Field of Classification Search
CPC .. G02B 6/0088; G02B 6/0096; G02B 6/0065; G02B 6/0011

USPC .......................................................... 362/623
See application file for complete search history.

(56) References Cited

U.S. PATENT DOCUMENTS

| | | | | |
|---|---|---|---|---|
| 7,125,137 B2 * | 10/2006 | Kitajima et al. | ............... | 362/153 |
| 2008/0068530 A1 * | 3/2008 | Lee et al. | ......................... | 349/58 |
| 2008/0117356 A1 * | 5/2008 | Oku et al. | ....................... | 349/62 |
| 2008/0252819 A1 * | 10/2008 | Hung | ............................... | 349/65 |
| 2011/0292317 A1 * | 12/2011 | Kim et al. | ....................... | 349/61 |

FOREIGN PATENT DOCUMENTS

| | | |
|---|---|---|
| CN | 101097357 A | 1/2008 |
| CN | 201706345 U | 1/2011 |
| CN | 102011989 A | 4/2011 |
| KR | 10-2008-0034716 A | 4/2008 |
| KR | 10-2012-0055974 A | 6/2012 |

* cited by examiner

*Primary Examiner* — Jason Moon Han
(74) *Attorney, Agent, or Firm* — Cheng-Ju Chiang

(57) ABSTRACT

The present invention provides a backlight module, which includes a backplane, a backlight source arranged inside the backplane, a light guide plate arranged inside the backplane and corresponding to the backlight source, a plurality of positioning units arranged between the backplane and the light guide plate, a reflector plate arranged between the backplane and the light guide plate and mounted to the positioning units, and optic films arranged on the light guide plate. The positioning units each have an end fixed to the light guide plate, an opposite end fixed to the backplane, and an intermediate portion which is provided with a positioning section. The reflector plate is mounted to the positioning sections so that the light guide plate and the reflector plate form therebetween a gap. The gap helps preventing the light guide plate and the reflector plate from contacting and rubbing each other.

11 Claims, 5 Drawing Sheets

BACKLIGHT MODULE

BACKGROUND OF THE INVENTION

1. Field of the Invention

The present invention relates to the field of liquid crystal display, and in particular to a structure of backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and the liquid crystal molecules are controlled to change direction by application of electricity to the glass substrates in order to refract out light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module comprises a light source, such as a cold cathode fluorescent lamp (CCFL) or a light-emitting diode (LED), which is arranged at the back side of the liquid crystal panel to form a planar light source that directly provides lighting to the liquid crystal panel. The side-edge backlight module comprises a backlighting source of an LED light bar arranged at an edge of a backplane that is located rearward of one side of the liquid crystal panel. The LED light bar emits light that enters a light guide plate (LGP) through a light incident face of the light guide plate and, after being reflected and diffused, is projected out through a light emergence face of the light guide plate to form a planar light source for the liquid crystal panel.

Referring to FIG. 1, a conventional LED based side-edge backlight module comprises a backplane 100, a backlight source 300 arranged inside the backplane 100, a light guide plate 500 arranged inside the backplane 100 to correspond to the backlight source 300, a reflector plate 700 arranged on a bottom surface of the light guide plate 500, and optic films 900 arranged on a top surface of the light guide plate 500. The light guide plate 500 is made of a material of polymethyl-methacrylate (PMMA) or methacrylate-butadiene-styrene copolymer (MBS), which has a light weight and better mechanical strength. In the conventional structure, the upper side of the backplane 100 is positioned against the reflector plate 700 and the upper side of the reflector plate 700 is tightly positioned against the light guide plate 500. This arrangement causes the backplane 100, the reflector 700, and the light guide plate 500 to physically engage and rub each other in mechanical vibration and impacts. Further, due to influence caused by the assembling environment, foreign objects may be trapped between the reflector plate 700 and the light guide plate 500 during the process of assembling. The foreign objects may rub the light guide plate 500 and the reflector plate 700 in mechanical vibration and impacts. This may easily result in scratching of the light guide plate thereby showing white spots or white staining on the screen. Problems of optic quality may thus result, deteriorating the displaying quality of the liquid crystal display device using such a backlight module.

SUMMARY OF THE INVENTION

An object of the present invention is to provide a backlight module, which provides excellent protection of a light guide plate from being scratched in mechanical vibration or impacts thereby eliminating the concern about optic quality and ensuring the displaying quality of the liquid crystal display device using the backlight module.

To achieve the above object, the present invention provides a backlight module, which comprises a backplane, a backlight source arranged inside the backplane, a light guide plate arranged inside the backplane and corresponding to the backlight source, a plurality of positioning units arranged between the backplane and the light guide plate, a reflector plate arranged between the backplane and the light guide plate and mounted to the positioning units, and optic films arranged on the light guide plate. The positioning units each have an end fixed to the light guide plate, an opposite end fixed to the backplane, and an intermediate portion which is provided with a positioning section. The reflector plate is mounted to the positioning sections so that the light guide plate and the reflector plate form therebetween a gap.

The positioning units are in the form of a bolt comprising a connection bar and first and second mounting sections arranged at two ends of the connection bar. The positioning section is arranged at an intermediate portion of the connection bar. The first and second mounting sections are circular in shape. The positioning section is annulus in shape.

One of the ends of the connection bar is integrally formed with the first mounting section and the other end forms a first thread. The intermediate portion forms a second thread. The second mounting section forms a first threaded hole corresponding to the first thread, whereby with the first thread engaging the first threaded hole, the second mounting section and the connection bar are connected together. The positioning section has an inner circumferential surface forming a second threaded hole corresponding to the second thread, whereby with the second thread engaging the second threaded hole, the positioning section is fixed to the intermediate portion of the connection bar.

The first mounting section and the light guide plate are integrally formed with each other.

The first mounting section is adhesively fixed to the light guide plate.

The second mounting section is mounted to the backplane and the connection bar is fixed the second mounting section through tapping connection.

The second mounting section is adhesively fixed to the backplane.

The positioning units are arranged at opposite side edges of the light guide plate and edges of the reflector plate are fixed to the positioning sections.

The reflector plate is fixed to the positioning section through adhesives.

The positioning units are of a number of 8 and are symmetrically arranged at opposite sides of the light guide plate.

The present invention also provides a backlight module, which comprises a backplane, a backlight source arranged inside the backplane, a light guide plate arranged inside the backplane and corresponding to the backlight source, a plurality of positioning units arranged between the backplane and the light guide plate, a reflector plate arranged between the backplane and the light guide plate and mounted to the positioning units, and optic films arranged on the light guide plate, the positioning units each having an end fixed to the light guide plate, an opposite end fixed to the backplane, and an intermediate portion which is provided with a positioning section, the reflector plate being mounted to the positioning sections so that the light guide plate and the reflector plate form therebetween a gap;

wherein the positioning units are in the form of a bolt comprising a connection bar and first and second mounting sections arranged at two ends of the connection bar, the positioning section being arranged at an intermediate portion of the connection bar, the first and second mounting sections being circular in shape, the positioning section being annulus in shape;

wherein one of the ends of the connection bar is integrally formed with the first mounting section and the other end forms a first thread, the intermediate portion forming a second thread, the second mounting section forming a first threaded hole corresponding to the first thread, whereby with the first thread engaging the first threaded hole, the second mounting section and the connection bar are connected together, the positioning section having an inner circumferential surface forming a second threaded hole corresponding to the second thread, whereby with the second thread engaging the second threaded hole, the positioning section is fixed to the intermediate portion of the connection bar;

wherein the first mounting section and the light guide plate are integrally formed with each other;

wherein the second mounting section is adhesively fixed to the backplane;

wherein the positioning units are arranged at opposite side edges of the light guide plate and edges of the reflector plate are fixed to the positioning sections;

wherein the reflector plate is fixed to the positioning section through adhesives; and wherein the positioning units are of a number of 8 and are symmetrically arranged at opposite sides of the light guide plate.

The efficacy of the present invention is that the present invention provides a backlight module, which comprises positioning units to provide an arrangement that a gap is formed between a light guide plate and a reflector plate so that the light guide plate and the reflector plate are not allowed to contact and rub each other in mechanical vibration and impacts thereby ensuring that the light guide plate will not be damaged by scratching and thus being advantageous in eliminating optic quality problem caused by scratching occurring during the transportation of the backlight module and ensuring the displaying quality of a liquid crystal display device using the backlight module.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
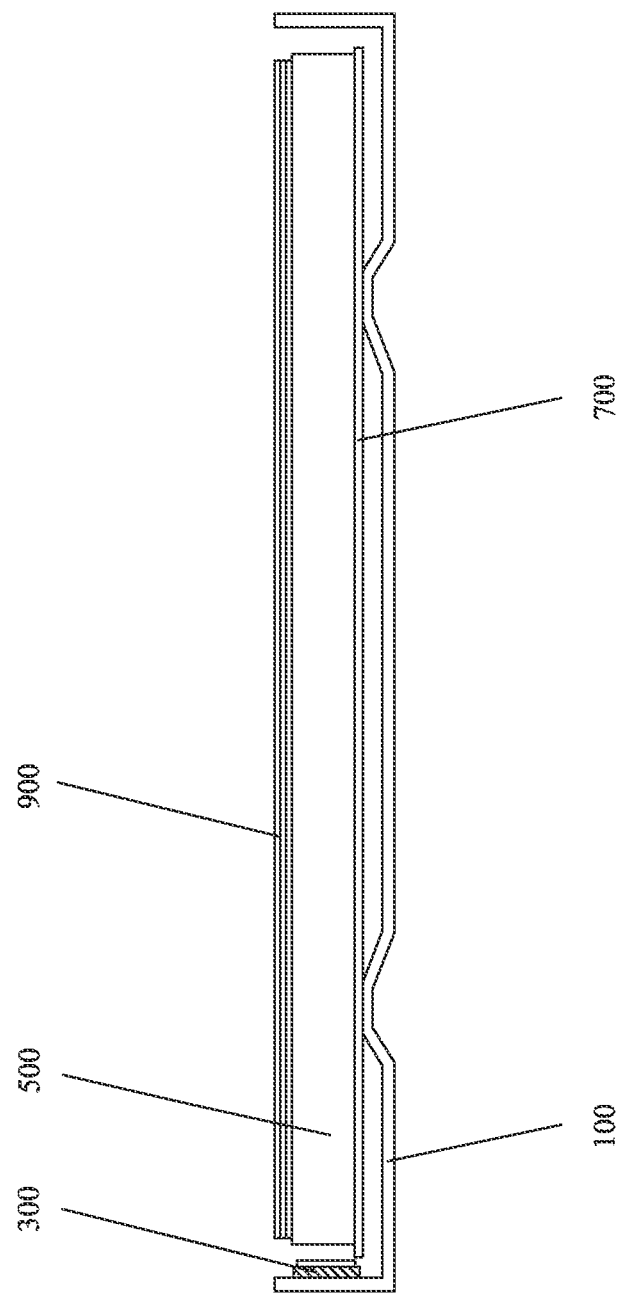
FIG. 1 is a schematic view showing a conventional backlight module.
Figure 2:
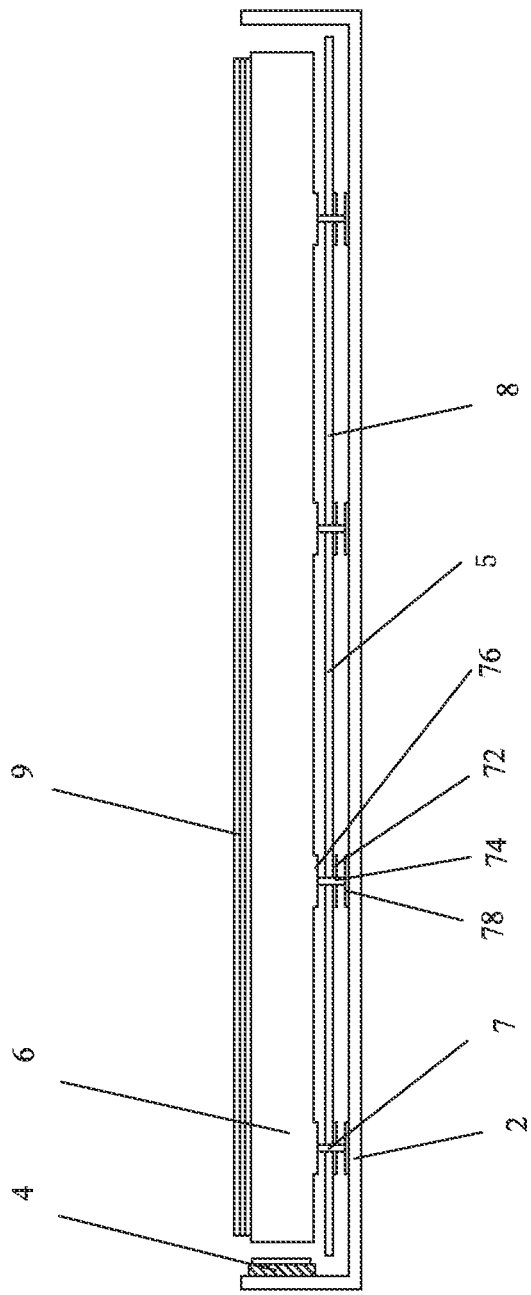
FIG. 2 is a schematic view showing a backlight module according to the present invention.
Figure 3:
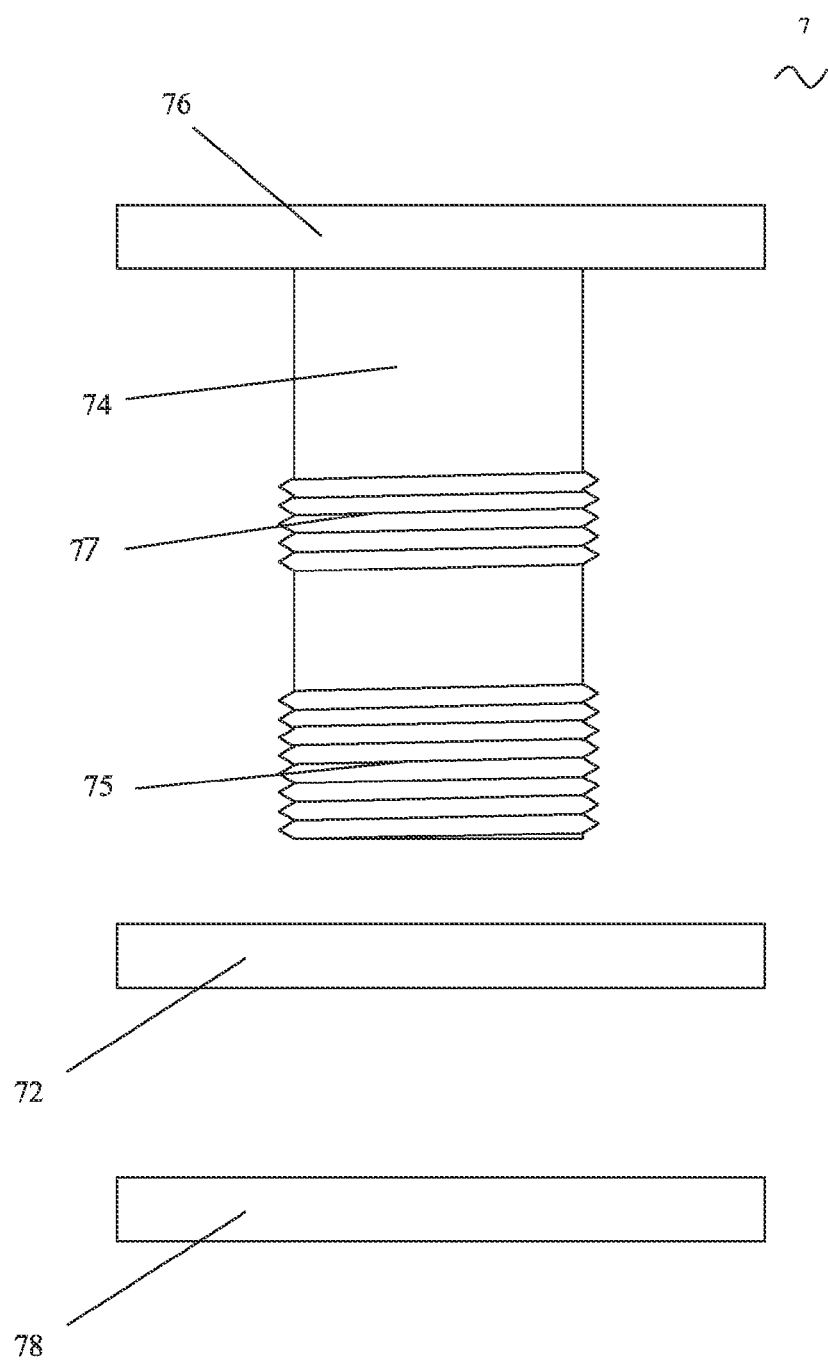
FIG. 3 is an exploded view showing a positioning unit according to the present invention.
Figure 4:
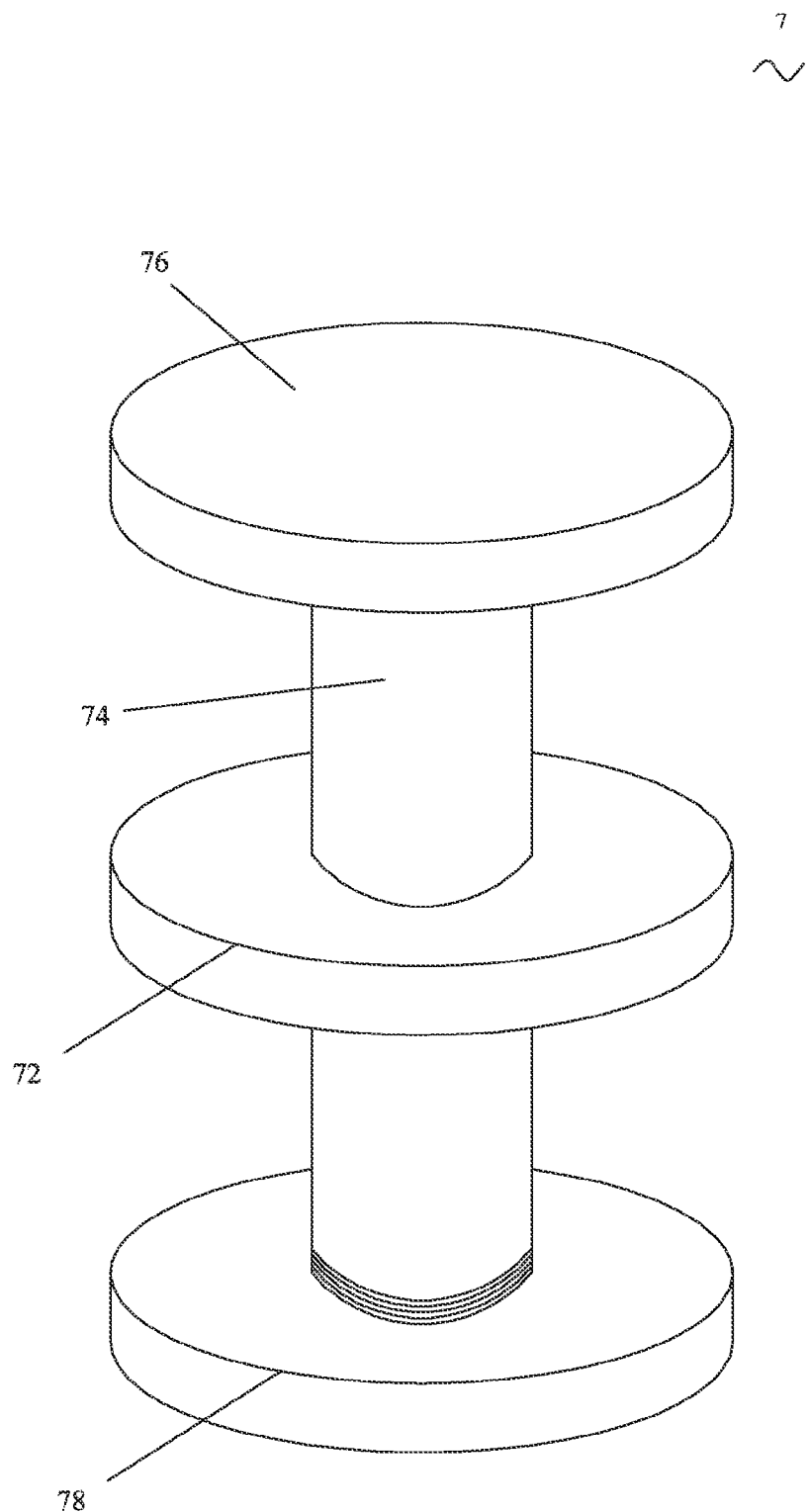
FIG. 4 is a schematic view showing the positioning unit of FIG. 3 in an assembled form.

Referring to FIGS. 2-4, the present invention provides a backlight module, which comprises a backplane 2, a backlight source 4 arranged inside the backplane 2, a light guide plate 6 arranged inside the backplane 2 and corresponding to the backlight source 4, a plurality of positioning units 7 arranged between the backplane 2 and the light guide plate 6, a reflector plate 8 arranged between the backplane 2 and the light guide plate 6 and mounted to the positioning units 7, and optic films 9 arranged on the light guide plate 6. The positioning units 7 each has an end fixed to the light guide plate 6, an opposite end fixed to the backplane 2, and an intermediate portion which is provided with a positioning section 72. The reflector plate 8 is mounted to the positioning sections 72 so that the light guide plate 6 and the reflector plate 8 form therebetween a gap 5. With a gap 5 present between the light guide plate 6 and the reflector plate 8, it can effectively prevent physical contact and thus rubbing occurring between the light guide plate 6 and the reflector plate 8 and the backplane 2 in mechanical vibration and impact; and when tiny particles, such as foreign objects and dusts, exist between the light guide plate 6 and the reflector plate 8, no scratch will be made on the light guide plate 6 even if they contact each other, whereby the optic quality of the backlight module can be ensured and the displaying quality of a liquid crystal display device using the backlight module is thus ensured.

In the instant preferred embodiment, the positioning units 7 are in the form of a bolt comprising a connection bar 74 and first and second mounting sections 76, 78 arranged at two ends of the connection bar 74. The positioning section 72 is arranged at an intermediate portion of the connection bar 74. The first and second mounting sections 76, 78 are circular in shape and the positioning section 72 is annulus in shape.

One of the ends of the connection bar 74 is integrally formed with the first mounting section 76 and the other end forms a first thread 75; the intermediate portion forms a second thread 77. The second mounting section 78 forms a first threaded hole (not shown) corresponding to the first thread 75, whereby with the first thread 75 engaging the first threaded hole, the second mounting section 78 and the connection bar 74 are connected together. The positioning section 72 has an inner circumferential surface forming a second threaded hole (not shown) corresponding to the second thread 77. With the second thread 77 engaging the second threaded hole, the positioning section 72 is fixed to the intermediate portion of the connection bar 74. The arrangement of engagement between threads and threaded holes makes it possible to adjust the gap 5 between the light guide plate 6 and the reflector plate 8 and the distance between the reflector plate 8 and the backplane 2 so as to improve flexibility thereof.

In the instant preferred embodiment, the first mounting section 76 and the light guide plate 6 can be integrally formed with each other. Under such a condition, the second mounting section 78 can be adhesively fixed to the backplane 2. To set up, the annular positioning section 72 is mounted to the second thread 77 of the connection bar and the reflector plate 8 is mounted to the positioning section 72. The second mounting section 78 is mounted to the first thread 75 of the connection bar and then the second mounting section 78 is adhesively mounted to the backplane 2 to mount the reflector plate 8 and the light guide plate 6 to the backplane 2.

The positioning units 7 are arranged at opposite side edges of the light guide plate 6 and edges of the reflector plate 8 are fixed to the positioning sections 72. In the instant preferred embodiment, the positioning units 7 are of a number of 8 and are symmetrically arranged at opposite sides of the light guide plate 6. The reflector plate 8 is fixed to the positioning sections 72 through adhesives.

Figure 5:
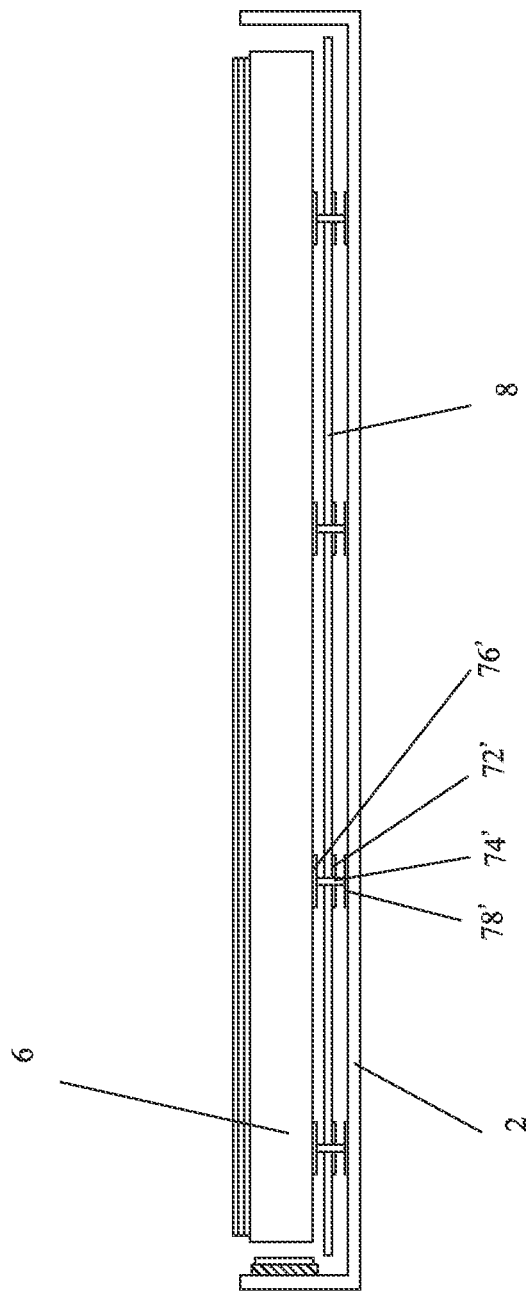
FIG. 5 is a schematic view showing a backlight module according to another preferred embodiment of the present invention.

Referring to FIG. 5, in another preferred embodiment that might serve as an alternative solution, the first mounting section 76' is adhesively fixed to the light guide plate 6. Under this condition, the connection bar 74' is fixed to the first mounting section 76' through tapping connection. The second mounting section 78' is adhesively fixed to the backplane 2 or alternatively the second mounting section 78' is formed on the backplane 2 and integrated with the backplane 2. To set up, the annular positioning section 72' is mounted to an intermediate portion of the connection bar 74' and the reflector plate 8 is mounted to the positioning section 72'. The connection bar 74' is mounted, through tapping connection, to the second mounting section 78', where the second mounting section 78' is integrated with the backplane 2 or is mounted to the backplane 2 by adhesives. Then, the first mounting section 76' is adhesively fixed to the light guide plate 6, thereby mounting the reflector plate 8 and the light guide plate 6 to the backplane 2.

In summary, the present invention provides a backlight module, which comprises positioning units to provide an arrangement that a gap is formed between a light guide plate and a reflector plate so that the light guide plate and the reflector plate are not allowed to contact and rub each other in mechanical vibration and impacts thereby ensuring that the light guide plate will not be damaged by scratching and thus being advantageous in eliminating optic quality problem caused by scratching occurring during the transportation of the backlight module and ensuring the displaying quality of a liquid crystal display device using the backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising a backplane, a backlight source arranged inside the backplane, a light guide plate arranged inside the backplane and corresponding to the backlight source, a plurality of positioning units arranged between the backplane and the light guide plate, a reflector plate arranged between the backplane and the light guide plate and mounted to the positioning units, and optic films arranged on the light guide plate, the positioning units each having an end fixed to the light guide plate, an opposite end fixed to the backplane, and an intermediate portion which is provided with a positioning section, the reflector plate being mounted to the positioning sections so that the light guide plate and the reflector plate form therebetween a gap;

wherein the positioning section is movable along the intermediate portion of the positioning unit so that the gap between the light guide plate and the reflector plate is adjustable and a distance between the reflector plate and the backplane is adjustable.

2. The backlight module as claimed in claim 1, wherein the positioning units are in the form of a bolt comprising a connection bar and first and second mounting sections arranged at two ends of the connection bar, the positioning section being arranged at an intermediate portion of the connection bar, the first and second mounting sections being circular in shape, the positioning section being annulus in shape.

3. The backlight module as claimed in claim 2, wherein one of the ends of the connection bar is integrally formed with the first mounting section and the other end forms a first thread, the intermediate portion forming a second thread, the second mounting section forming a first threaded hole corresponding to the first thread, whereby with the first thread engaging the first threaded hole, the second mounting section and the connection bar are connected together, the positioning section having an inner circumferential surface forming a second threaded hole corresponding to the second thread, whereby with the second thread engaging the second threaded hole, the positioning section is fixed to the intermediate portion of the connection bar.

4. The backlight module as claimed in claim 2, wherein the first mounting section and the light guide plate are integrally formed with each other.

5. The backlight module as claimed in claim 2, wherein the first mounting section is adhesively fixed to the light guide plate.

6. The backlight module as claimed in claim 5, wherein the second mounting section is mounted to the backplane and the connection bar is fixed to the second mounting section through tapping connection.

7. The backlight module as claimed in claim 2, wherein the second mounting section is adhesively fixed to the backplane.

8. The backlight module as claimed in claim 1, wherein the positioning units are arranged at opposite side edges of the light guide plate and edges of the reflector plate are fixed to the positioning sections.

9. The backlight module as claimed in claim 1, wherein the reflector plate is fixed to the positioning section through adhesives.

10. The backlight module as claimed in claim 1, wherein the positioning units are of a number of 8 and are symmetrically arranged at opposite sides of the light guide plate.

11. A backlight module, comprising a backplane, a backlight source arranged inside the backplane, a light guide plate arranged inside the backplane and corresponding to the backlight source, a plurality of positioning units arranged between the backplane and the light guide plate, a reflector plate arranged between the backplane and the light guide plate and mounted to the positioning units, and optic films arranged on the light guide plate, the positioning units each having an end fixed to the light guide plate, an opposite end fixed to the backplane, and an intermediate portion which is provided with a positioning section, the reflector plate being mounted to the positioning sections so that the light guide plate and the reflector plate form therebetween a gap;

wherein the positioning section is movable along the intermediate portion of the positioning unit so that the gap between the light guide plate and the reflector plate is adjustable and a distance between the reflector plate and the backplane is adjustable;

wherein the positioning units are in the form of a bolt comprising a connection bar and first and second mounting sections arranged at two ends of the connection bar, the positioning section being arranged at an intermediate portion of the connection bar, the first and second mounting sections being circular in shape, the positioning section being annulus in shape;

wherein one of the ends of the connection bar is integrally formed with the first mounting section and the other end forms a first thread, the intermediate portion forming a second thread, the second mounting section forming a first threaded hole corresponding to the first thread, whereby with the first thread engaging the first threaded hole, the second mounting section and the connection bar are connected together, the positioning section having an inner circumferential surface forming a second threaded hole corresponding to the second thread, whereby with the second thread engaging the second threaded hole, the positioning section is fixed to the intermediate portion of the connection bar;

wherein the first mounting section and the light guide plate are integrally formed with each other;

wherein the second mounting section is adhesively fixed to the backplane;

wherein the positioning units are arranged at opposite side edges of the light guide plate and edges of the reflector plate are fixed to the positioning sections;

wherein the reflector plate is fixed to the positioning section through adhesives; and wherein the positioning units are of a number of 8 and are symmetrically arranged at opposite sides of the light guide plate.

* * * * *